United States Patent [19]
Fengler et al.

[11] 3,884,483
[45] May 20, 1975

[54] ANNULAR SEAL FOR COAXIAL TUBULAR MEMBERS

[76] Inventors: Werner H. Fengler; Richard R. Fengler, both of 23651 Fordson Dr., Dearborn, Mich. 48124

[22] Filed: July 2, 1973

[21] Appl. No.: 375,737

Related U.S. Application Data
[62] Division of Ser. No. 304,853, Nov. 8, 1972, abandoned.

[52] U.S. Cl.............. 277/208; 277/212 C; 188/322
[51] Int. Cl.............................................. F16j 15/18
[58] Field of Search............... 277/207, 208, 212 C; 188/284, 287, 314, 322; 16/66; 267/65, 34, 113, 115, 118, 120

[56] References Cited
UNITED STATES PATENTS
2,265,615  12/1941  Stalter................................ 277/208
2,670,976  3/1954  Owen............................. 277/212 F
3,166,334  1/1965  Waldrop............................. 277/208

Primary Examiner—Robert I. Smith

[57] ABSTRACT

Adapted to be installed between an outer tubular member having a generally cylindrical bore with axially-spaced enlargements therein and a generally cylindrical tubular inner member is a resilient sealing element consisting of a hollow cylindrical body of resilient material having a bore therethrough adapted to have sealing engagement with the tubular inner member and having at its opposite ends axially-spaced annular heads yieldingly engaging the spaced enlargements of the outer tubular member.

4 Claims, 5 Drawing Figures

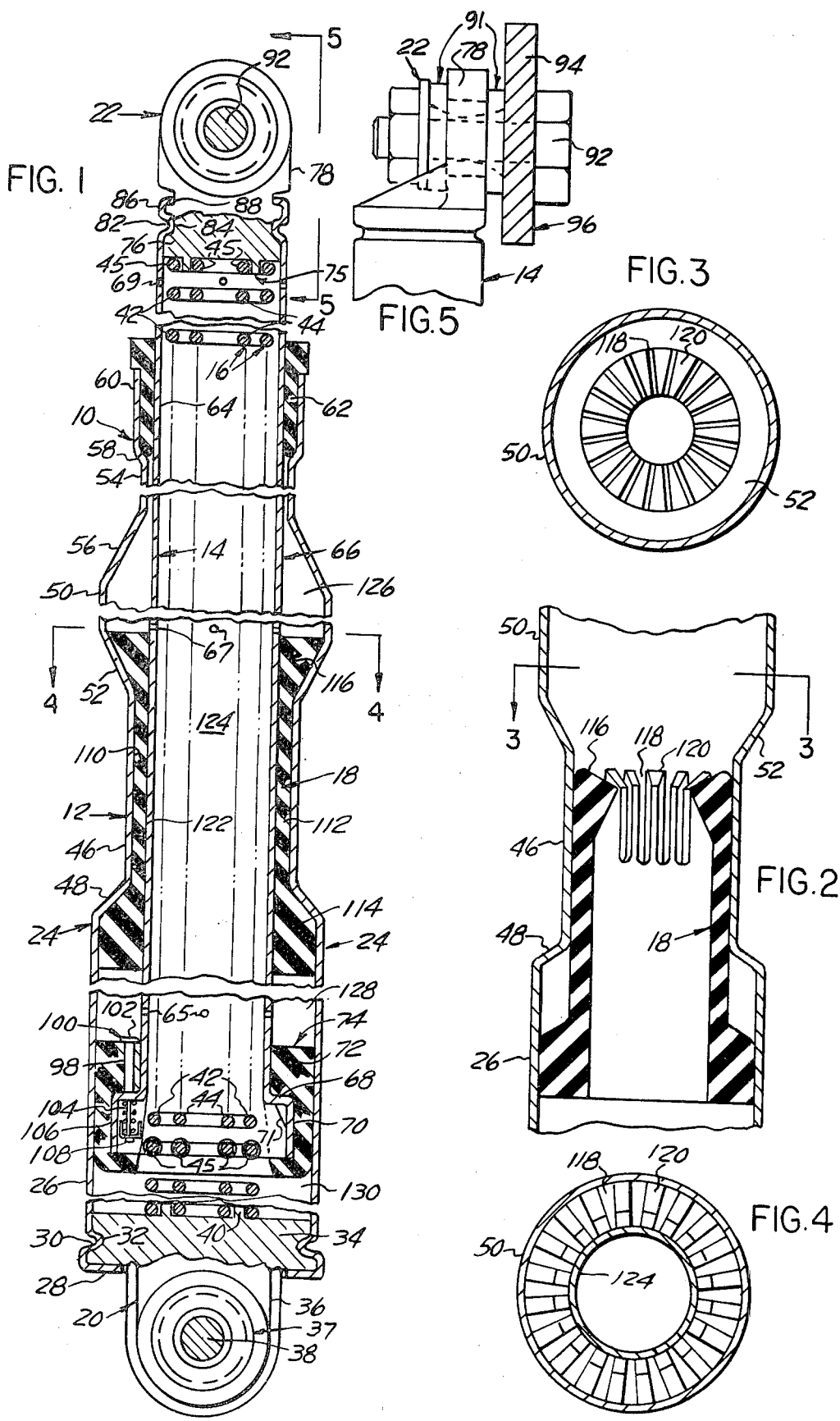

ANNULAR SEAL FOR COAXIAL TUBULAR MEMBERS

This application is a division of Fengler et al. application Ser. No. 304,853, filed Nov. 8, 1972, for Impact-Cushioning Expansible Strut and now abandoned.

SUMMARY OF THE INVENTION

The spool-shaped internal seal mounted between the outer and inner tubular members not only prevents leakage of fluid therebetween but also permits relative reciprocation, yet at the same time acts as a resilient stop for limiting this relative reciprocation.

In the drawings,

FIG. 1 is a central vertical longitudinal section through an impact-cushioning expansible strut, with the upper inner tubular arm withdrawn into the lower outer tubular arm in the almost fully expanded position of the strut;

FIG. 2 is a fragmentary longitudinal section similar to FIG. 1 but showing the first stage in the insertion of the hollow spool-shaped internal seal between the inner and outer arms;

FIG. 3 is a cross-section along the line 3—3 of FIG. 2, showing the compression of the upper or forward end of the internal seal while it is being inserted during assembly;

FIG. 4 is a cross-section along the line 4—4 in FIG. 1, showing the expanded upper end of the internal seal after insertion; and FIG. 5 is a fragmentary side elevation of the pivoting upper end of the strut looking in the direction of the arrows 5—5 in FIG. 1.

Referring to the drawing in detail, FIGS. 1 and 5 show an impact-cushioning expansible strut, generally designated 10, according to one form of the invention as consisting generally of a tubular lower outer strut arm 12 and a tubular upper inner hollow strut arm 14 reciprocable as a piston within the outer arm 12 as a cylinder and containing a weight-assisting or balancing spring unit 16. The two tubular arms 12 and 14 are slidable relatively to one another in telescoping relationship but are sealed relatively to one another by a special spool-shaped elastomeric internal intermediate seal 18 which also acts as a resilient stop. The lower and upper arms 12 and 14 are connected to a lower part of the car body and rear hatch by lower and upper pivotal connection heads 20 and 22 respectively.

The lower outer arm 12 includes a tubular outer wall, generally designated 24, consisting of a lower cylindrical portion 26 having an annular end wall 28 surrounding the lower pivotal connection 20 and crimped annularly at 30 to an annular groove 32 in the lower head 34 of the lower pivotal connection 20. The latter is preferably a steel or an aluminum casting acting as a head for the outer lower strut against which the assist spring unit 16 exterts its force. Integral with and extending downward from the lower head 34 is a lug 36 which in turn is bored at right angles to the longitudinal axis of the outer arm 12 to receive a pivot bolt 38. The pivot bolt 38 is similar to that of the upper pivotal connection 22 shown in FIG. 5 and described in detail below, and is secured to a lower part of the car body (not shown). The lower head 34 is provided on its upper surface with an upstanding annular rib 40 which spaces the lower ends of the individual outer and inner assist springs 42 and 44 respectively of the spring unit 16. A resilient bushing 37 is assembled between the lug 36 of the lower strut arm 12 and the pivot bolt 38, allowing a resilient swiveling action, should the upper and lower pivot bolts not lie in the same plane. This bushing 37 is preferably of a high-impact plastic, such as a polyamide plastic containing chips of polytetrafluoroethylene plastic. The material for the chips is sold commercially under the trade name "Teflon."

The upper end of the lower cylindrical portion 26 of the outer wall 24 is joined to a constricted intermediate cylindrical portion 46 (FIG. 1) by a convergent frusto-conical porton 48 integral therewith, whereas the upper end of the constricted cylindrical intermediate portion 46 is joined to an intermediate cylindrical portion 50 by an upwardly-diverging frusto-conical portion 52. The intermediate cylindrical portion 50 of the side wall 24 is joined at its upper end to a reduced diameter upper cylindrical portion 54 by a frusto-conical convergent portion 56. The upper cylindrical portion 54 in turn is joined by an upwardly flaring annular portion 58 to a cylindrical upper end portion 60. A flanged hollow cylindrical upper end external sealing and guiding bushing 62 closes the space between the cylindrical upper end portion 60 and the elongated cylindrical portion 64 of the tubular wall or piston rod 66 of the inner arm 14. The tubular wall 66 is provided with axially-spaced lower, intermediate and upper sets of coaxial circumferentially-spaced air bleed orifices 65, 67 and 69 respectively.

The lower end of the tubular wall or piston rod 66 is provided with a radial flange portion 68 which joins the elongated cylindrical wall 64 to a short lower cylindrical end wall portion 70 (FIG. 1). This construction is strengthened by a plurality of circumferentially-spaced ribs 71, one of which is shown at the bottom of FIG. 1. Surrounding the lower end of the tubular wall 66 is an elastomeric annular lower seal 72 which with the portions 68 and 70 forms a resilient piston head, generally designated 74, on the lower end of the tubular wall 66. The upper end of the tubular wall or piston rod 66 is closed by the upper head 76 of the upper pivotal connection 22, which includes an offset pivot lug 78 integral with the upper head 76 extending upward therefrom. The upper head 76 is preferably a steel or an aluminum casting, acting as a head for the upper inner strut 14 against which the assist and counterbalancing spring unit 16 exerts its force. The upper head 76 is joined to the upper end of the tubular wall or piston rod 66 by an annular crimped portion 82 extending into a lower annular groove 84. The tubular wall or piston rod 66 at its upper end terminates in an annular end portion 86 extending into an annular groove 88. The upper head 76, similarly to the lower head 34, is provided with a downwardly-projecting annular rib 75 which spaces the upper ends of the individual outer and inner assist springs 42 and 44 of the spring unit 16. These springs are preferably provided with a coating 45 of elastomeric material in order to prevent any ratchet-like noise while being expanded or contracted.

The offset pivot lug 78 is bored transversely for the reception of an upper pivot bolt 92 which is similar to the lower pivot bolt 38, and which passes through a side portion 94 of the vehicle body hatch, generally designated 96. A resilient bushing 91 is assembled between the lug 78 of the upper strut arm 14 and the pivot bolt 92, allowing a resilient swiveling action as described for the lower strut arm 12. This bushing is preferably of a high-impact plastic, such as a polyamide plastic containing chips of polytetrafluoroethylene plastic, sold commercially under the trade name "Teflon".

The portion 68 of the piston head 74 and the adjacent annular seal 72 are drilled parallel to the axis of the inner arm 14 to receive the tubular valve casing 98 (FIG. 1) of a relief valve, generally designated 100, the head 102 of which covers the upper end of the tubular casing 98 while the stem 104 is urged downward by a helical compression spring 106 acting against the enlargement 108 on the lower end of the valve stem 104. This elastomeric annular lower seal 72 is preferably of a high-impact plastic, such as polyamide plastic containing chips of polytetrafluoroethylene plastic, sold commercially under the trade name "Teflon".

The constricted intermediate cylindrical portion 46, the frustoconical portions 48 and 52 adjacent thereto, and the upper part of the lower cylindrical portion 26 (FIG. 1), together with the tubular wall of piston rod 64, enclose a spool-shaped space 110 which, upon assembly of the component parts of the strut 10, is occupied by the spool-shaped hollow elastomeric internal seal 18. The seal 18, as shown in FIGS. 1 to 4 inclusive, consists of a central hollow cylindrical neck portion 112 with a solid annular lower enlargement 114 on its lower end and a radially slotted annular upper enlargement 116 on its upper end. As the internal seal 18 is made of elastomeric material, such as natural or synthetic rubber or of a polyamide plastic containing chips of polytetrafluoroethylene plastic, sold commercially under the trade name "Teflon", the enlargements 114 and 116 are resilient and the slots 118 in the upper head 116 provide compressibility thereof to facilitate the insertion of the internal seal 18 into the spool-shaped chamber 110, in the manner described below.

Prior to the closing of the lower end thereof by the crimping 30 and by the insertion of the lower pivotal connection 20, the internal seal 18 is inserted within the hollow outer arm 12 by following the procedure shown in FIG. 2. In so doing, the workman assembling the strut 10 pushes the slotted head 116 of the internal seal 18 into the lower cylindrical portion 26 (FIG. 2), whereupon, in passing from the cylindrical portion 26 through the convergent portion 48, its lobes 120 between its slots 118 yield radially inward, as shown in the upper portion of FIG. 2 and in FIG. 3. The assembler continues to push the internal seal 18 inward until the slotted upper enlargement 116 thereof passes upward out beyond the constricted cylindrical portion 46 into the upwardly-diverging portion 52, whereupon the lobes 120 between the radial slots 118 in the upper enlargement 116 expand outward by reason of the resilient elastomeric material thereof. This causes the radial slots 118 between the lobes 120 to widen (FIG. 4). The internal seal 18 comes to rest with the lower enlargement 114 abutting against the convergent wall portion 48 and with the upper enlargement 116 occupying the space within the upwardly-flared portion 52. After inserting the upper portion of the upper arm 14, which is being guided by a bullet-nose portion (not shown) and which during assembly will be discarded, and replaced with the upper head 76, the flared upper enlargement 116 is prevented from collapsing, thereby holding the internal seal 18 securely in place between the flared portions 48 and 52 of the lower arm 12.

In the operation of the impact-cushioning expansible strut 10, let it be assumed that the pivotal connections 20 and 22 have been joined to the lower part of the car body (not shown) and to the hatch 96 by their respective pivot bolts 38 and 92, and that the hatch is in its closed position extending downward from its hinges which connect it to the car body roof. To raise the hatch and open the hatchway at the rearward end of the car body, the user grasps the handle (not shown) on the lower end of the hatch and swings it upward and rearward. During this initial stage of the operation, the weight of the hatch is counterbalanced by the springs 42 and 44. As the hatch is raised, however, and the struts 10, of which there are two on opposite sides of the hatch, assume a more nearly perpendicular position relatively to the hatch, the hitherto compressed springs 42 and 44 are able to apply their maximum force as they expand. The upwardly accelerating speed of the hatch during the upper part of its opening procedure, however, is now retarded by the air imprisoned in the space between the lower head 114 of the internal seal 18 and the piston head 74. The lower air bleeds through orifices 65 until these pass into the central bore 122 in the internal seal 18 and are thereby closed. Thus, the violent metal-to-metal clashing which previously occurred in prior expansible struts, when applied to heavy hatches, is effectively prevented by the present invention. The air within the central chamber 124 of the inner arm 14 can pass into and out of the upper space 126 bounded by the intermediate cylindrical portion 50 and frusto-conical portion 56 of the outer side wall 24 through the upper air bleed orifices 67 and 69, which are arranged as required by the force exerted and according to the rate of the springs.

To close the hatch, the operator reverses the above-described procedure. Grasping the handle on the now-raised hatch, he pulls downward upon it, thereby causing the tubular upper inner arm 14 to telescope with the tubular lower outer arm 12 as the former passes downward into the latter. The air entrapped in the lower chamber 130 adjacent the base 34 of the lower pivotal connection 20 escapes into the intermediate chamber 128 and thence through the air bleed orifices 65 into the inner chamber 124 of the inner arm 14 by the opening of the relief valve 100. At the same time, the helical compression springs 42 and 44 are compressed, thereby storing up energy for assisting in the next opening of the hatch.

We claim:

1. An elongated annular sealing element adapted to be pushed into simultaneous sealing engagement between an elongated cylindrical constriction in the elongated internal cylindrical surface of a hollow outer member and a cylindrical inner member reciprocable relatively thereto, said sealing element comprising an elongated spool-shaped body of resilient material having therethrough a bore with an elongated internal cylindrical sealing surface adapted to sealingly engage the cylindrical inner member, said body near its opposite ends having axially-spaced annular enlargements adapted to sealingly engage said internal cylindrical surface externally of the constriction thereof and having a reduced-diameter neck portion extending between said enlargements, said neck portion having thereon an elongated external cylindrical sealing surface extending circumferentially therearound and adapted to sealingly engage the elongated cylindrical constriction, and means associated with one of said enlargements and responsive to the passage thereof into the constriction for enabling temporary contraction of said one enlargement and responsive to the emergence thereof from the constriction for enabling subsequent expansion of said one enlargement.

2. An elongated annular sealing element, according to claim 1, wherein said means includes a cut-away section in said one enlargement.

3. An elongated annular sealing element, according to claim 2, wherein said cut-away section comprises a slotted portion in said one enlargement.

4. An elongated annular sealing element, according to claim 1, wherein the diameters of said enlargements are substantially the same.

* * * * *